(12) United States Patent
Hockman

(10) Patent No.: US 11,837,079 B2
(45) Date of Patent: *Dec. 5, 2023

(54) INFRASOUND DRIVE FOR HAPTIC EXPERIENCES

(71) Applicant: MSG Entertainment Group, LLC, New York, NY (US)

(72) Inventor: Erik Hockman, New York, NY (US)

(73) Assignee: MSG Entertainment Group, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,640

(22) Filed: Mar. 4, 2022

(65) Prior Publication Data

US 2022/0189262 A1    Jun. 16, 2022

Related U.S. Application Data

(63) Continuation of application No. 17/138,535, filed on Dec. 30, 2020, now Pat. No. 11,302,157.
(Continued)

(51) Int. Cl.
   *H04B 3/36*      (2006.01)
   *G08B 6/00*      (2006.01)
   *H04L 12/10*     (2006.01)

(52) U.S. Cl.
   CPC .............. *G08B 6/00* (2013.01); *H04L 12/10* (2013.01)

(58) Field of Classification Search
   CPC ........ B60Q 1/44; B60Q 1/30; B60Q 2900/30; B60Q 1/2661; B60Q 1/302; B60J 7/1226; B60J 7/1291
(Continued)

(56) References Cited

U.S. PATENT DOCUMENTS 5,314,403 A * 5/1994 Shaw ................. A61H 23/0236
                                                                601/55
9,949,004 B2 * 4/2018 Cohen ..................... H04R 1/028
(Continued)

FOREIGN PATENT DOCUMENTS

EP          3620893 A1 *  3/2020  ............. G06F 3/016

OTHER PUBLICATIONS

International Search Report and Written Opinion of the International Searching Authority directed to related International Patent Application No. PCT/US2021/012705, dated Mar. 31, 2021; 17 pages.

*Primary Examiner* — Tai T Nguyen
(74) *Attorney, Agent, or Firm* — Sterne, Kessler, Goldstein & Fox P.L.L.C.

(57) ABSTRACT

An infrasound drive system and method are disclosed. An infrasound drive system includes a control circuit for transmitting a data signal and a power signal, and one or more infrasound drive that includes an input terminal, an amplifier and a tactile transducer, in one or more infrasound drives, the amplifier receives a power signal from the power channel and a data signal from the data channel. The amplifier outputs an amplified signal to the tactile transducer. The tactile transducer generates a tactile vibration based on the data signal and the power signal. An infrasound drive can be disposed in a housing and transmit a haptic force to a user in contact with the housing. A user can limit the haptic force transmitted by the infrasound drive. The power channel and the data channel can be provided by a power over Ethernet (PoE) cable.

20 Claims, 9 Drawing Sheets

Related U.S. Application Data

(60) Provisional application No. 62/958,537, filed on Jan. 8, 2020.

(58) Field of Classification Search
USPC ..................................................... 340/407.1
See application file for complete search history.

(56) References Cited

U.S. PATENT DOCUMENTS

| | | |
|---|---|---|
| 2009/0295202 A1 | 12/2009 | Takada et al. |
| 2011/0251535 A1 | 10/2011 | Bender |
| 2013/0229271 A1 | 9/2013 | Fantauzza |
| 2014/0087671 A1* | 3/2014 | Mostov ................. H02M 3/04 |
| | | 455/78 |
| 2014/0140179 A1* | 5/2014 | He ........................... B06B 1/10 |
| | | 367/190 |
| 2017/0242527 A1 | 8/2017 | Qutub et al. |
| 2018/0220237 A1 | 8/2018 | Tabatabai |
| 2019/0300020 A1 | 10/2019 | Alexiou et al. |
| 2021/0209905 A1 | 7/2021 | Hockman |

* cited by examiner

INFRASOUND DRIVE FOR HAPTIC EXPERIENCES

CROSS REFERENCE TO RELATED APPLICATION

This application is a continuation of U.S. patent application Ser. No. 17/138,535, filed Dec. 30, 2020, now U.S. Pat. No. 11,302,157, which claims the benefit of U.S. Provisional Application No. 62/958,537, filed on Jan. 8, 2020, both of which are incorporated by reference here in their entirety.

BACKGROUND

Haptic devices generate forces, vibrations, or motions to provide the sensation of touch and proprioception to the user. A haptic device may control the amount of force exerted on the user. Entertainment, theatrical or other venues may need to provide an experience to an audience having numerous users, with large venues potentially requiring accommodation for thousands of audience members. Such a large setting creates challenges in providing meaningful or similar haptic experiences to all audience members.

For example, it is difficult to provide a haptic experience through venue seating where a large power requirement is necessary to produce a perceptible haptic sensation to each user. Even if some level of haptic experience can be provided, power to drive a haptic device requires heavy gauge cabling that can be difficult to dispose in a discrete or efficient manner.

FIELD OF THE INVENTION

This application relates generally to haptic devices and to presentation of haptic forces to users in general and more specifically but not limited to presentation of haptic force to users in an entertainment venue.

BRIEF SUMMARY OF THE INVENTION

Embodiments described herein reduce the cost and complexity of a haptic drive system. In some embodiments, an i-drive system implements low frequency (LF) audio amplifiers and transducers based on power and data signals provided over a single unitary wiring, such as a power over Ethernet (PoE) cable. The i-drive system provides haptic force to a user based on a data signal (e.g., a digital audio signal) from an external source. Multiple low frequency audio amplifiers (e.g., a multichannel LF amplifier) can be integrated on a circuit board having a small footprint.

In some embodiments, an amplifier is disposed within an i-drive active unit that includes a transducer (e.g., a driver or seat driver). An input connector, such as a PoE cable, can provide both the power to the amplifier and a data signal (e.g., a digital audio signal) from the external source to the transducer (i.e., the seat driver).

In some embodiments, a neighboring i-drive passive unit can be configured to provide a similar quality haptic experience by connecting low gauge (e.g., short speaker wire) to a transducer from the i-drive active unit that includes the amplifier.

In some embodiments, a four channel LF amplifier is integrated into the i-drive unit, such that only one seat would require the wires carrying the digital audio signal from the outside source and power. Neighboring seats are connected to the i-drive active unit of that seat by short distance speaker wire jumpers. The i-drive arrangement reduces the cost of wire installation and removes the need to mount and service the amplifiers in a separate but nearby location. Other configurations using different channel count LF audio amplifiers are within the scope of this disclosure.

BRIEF DESCRIPTION OF THE DRAWINGS/FIGURES

DETAILED DESCRIPTION OF THE INVENTION

Infrasound Drive System

Figure 1A:
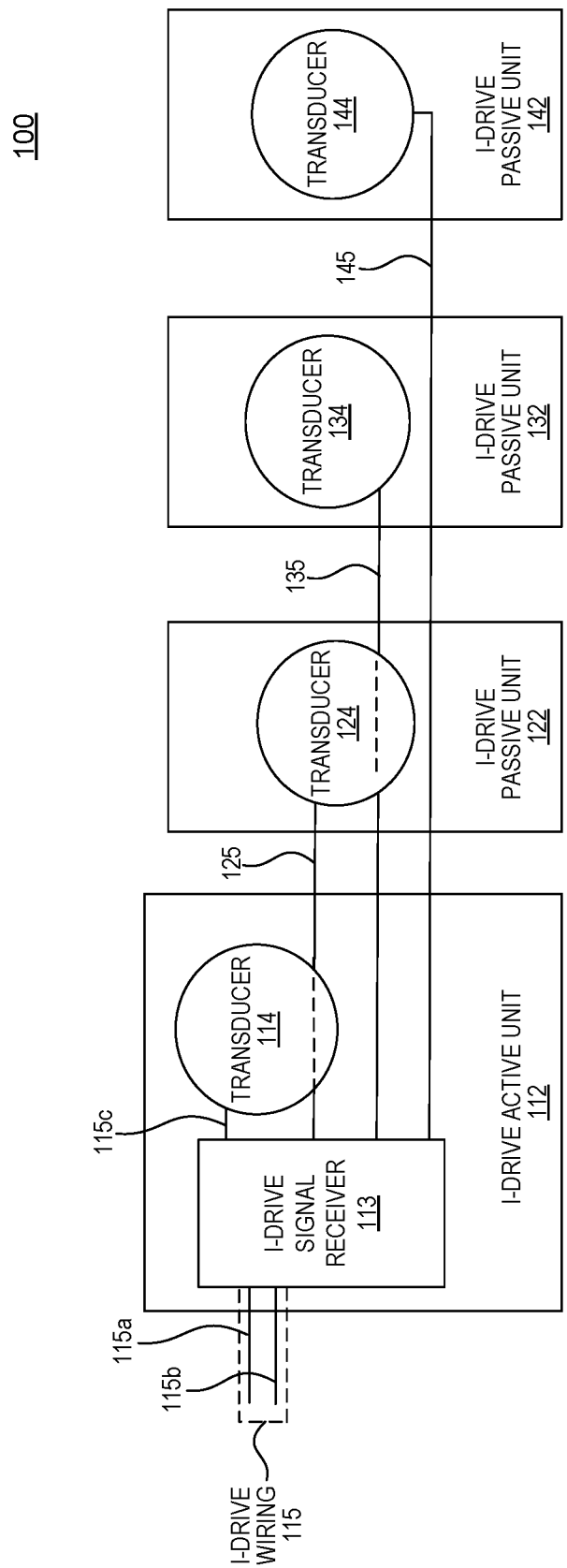
FIG. 1A is an illustration of an infrasound-drive system for haptic experiences, according to some embodiments.

FIG. 1A illustrates an infrasound drive system according to some embodiments. Referring to FIG. 1A, an infrasound drive (i-drive) system 100 represents a tactile audio system for providing haptic experiences. I-drive system 100 includes a first I-drive active unit 112, a first i-drive passive unit 122, a second i-drive passive unit 132, and a third i-drive passive unit 142. While four units are illustrated herein, the i-drive system 100 is not limited to this number of i-drive active or passive units.

An i-drive system 100 may be implemented with each of i-drive active unit 112 and first to third i-drive passive units 122, 132 and 142 disposed in an object supporting or in contact with a user. A first I-drive active unit 112 includes a transducer 114 and i-drive signal receiver 113 in a single unit. First i-drive passive unit 122 includes transducer 124. Second i-drive passive unit 132 includes transducer 134. Third i-drive passive unit 142 includes transducer 144. Each of i-drive active unit 112, and i-drive passive units 122 to 142 can be a unitary housing.

Each transducer 114, 124, 134 and 144, generates a tactile vibration based on a data (audio) signal provided to each unit. Thereby, a tactile vibration generated by each i-drive active or passive unit 112 to 142 can be transmitted through the object to each respective user providing a haptic sensation. Non-limiting examples can include any of the i-drive active unit 112, first i-drive passive unit 122, second i-drive passive unit 132 and third i-drive passive unit 142 disposed in a seat structure, a supporting structure for a seat structure, a floor or other supporting surface, a gaming device, a sensory substitution device for users having various disabilities, or the like.

One advantage of the i-drive system 100 is the implementation of a transducer 114 and i-drive signal receiver 113 in a single unit, i.e., i-drive active unit 112, powered by an i-drive wiring 115. The i-drive wiring 115 combines a power channel and a signal channel at low-cost. The self-contained unit can thus receive a power signal over a power channel 115a and a data signal over a data channel 115b, from i-drive wiring 115. In an embodiment, i-drive wiring 115 can be a unitary cable permitting the i-drive system to provide an amplified signal to each driver, and obviating the need for a separate power source to provide each amplified signal.

The transducer 114 of the i-drive active unit 112 and each of first to third i-drive passive units 122, 132 and 142 can be any suitable component that converts electrical energy to mechanical energy, such as a driver motor that can be directly or indirectly mounted or adapted to the object. In some embodiments, the transducer 114 can be an inertial drive motor, while in other embodiments, the transducer 114 can be a direct drive motor. In one non-limiting example, the transducer 114 of the i-drive active unit can be an inertial motor mounted directly to the object, such as a seat back of a seat structure. In another non-limiting example, the transducer 114 of the i-drive active unit can be a direct drive motor mounted to an arrangement of seat mounting brackets of a seat structure.

The i-drive signal receiver 113 can include at least an amplifier. In some embodiments, i-drive signal receiver 113 represents a low-frequency (LF) audio amplifier. In some embodiments, i-drive signal receiver 113 represents a multi-channel LF amplifier, such as a 4-channel LF audio amplifier. In some embodiments, the i-drive signal receiver 113 can include additional circuitry configured to perform one or more digital signal processing functions.

I-Drive system 100 includes at least one multichannel i-drive wiring 115 and one or more wirings to transmit amplified signals (e.g., amplified signal 125, 135, or 145) from i-drive signal receiver 113 to i-drive passive units 122, 132 or 142. I-drive wiring 115 can include multiple wiring channels. For example, i-drive wiring 115 can include a power channel 115a and a data channel 115b. In some embodiments, i-drive wiring 115 can include a power channel 115a providing up to 25.5 watts of power to i-drive active unit 112. In some embodiments, i-drive wiring 115 can include a power channel 115a providing up to 55 watts of power to i-drive active unit 112. In some embodiments, power channel 115a can provide up to approximately 100 watts of power to i-drive active unit 112. In some embodiments, power channel 115a can provide greater than 100 watts of power to i-drive active unit 112. Data channel 115b propagates a data signal, for example an audio signal, a digital signal, or the like, to the i-drive active unit.

I-drive wiring 115 can be a form of power over Ethernet cabling. For example, i-drive wiring 115 can be configured to be compliant with standards of POE, PoE+ or PoE++ (e.g., 802.3, 802.3af, 802.3at, 802.3bt) or any later POE standard.

Figure 1B:
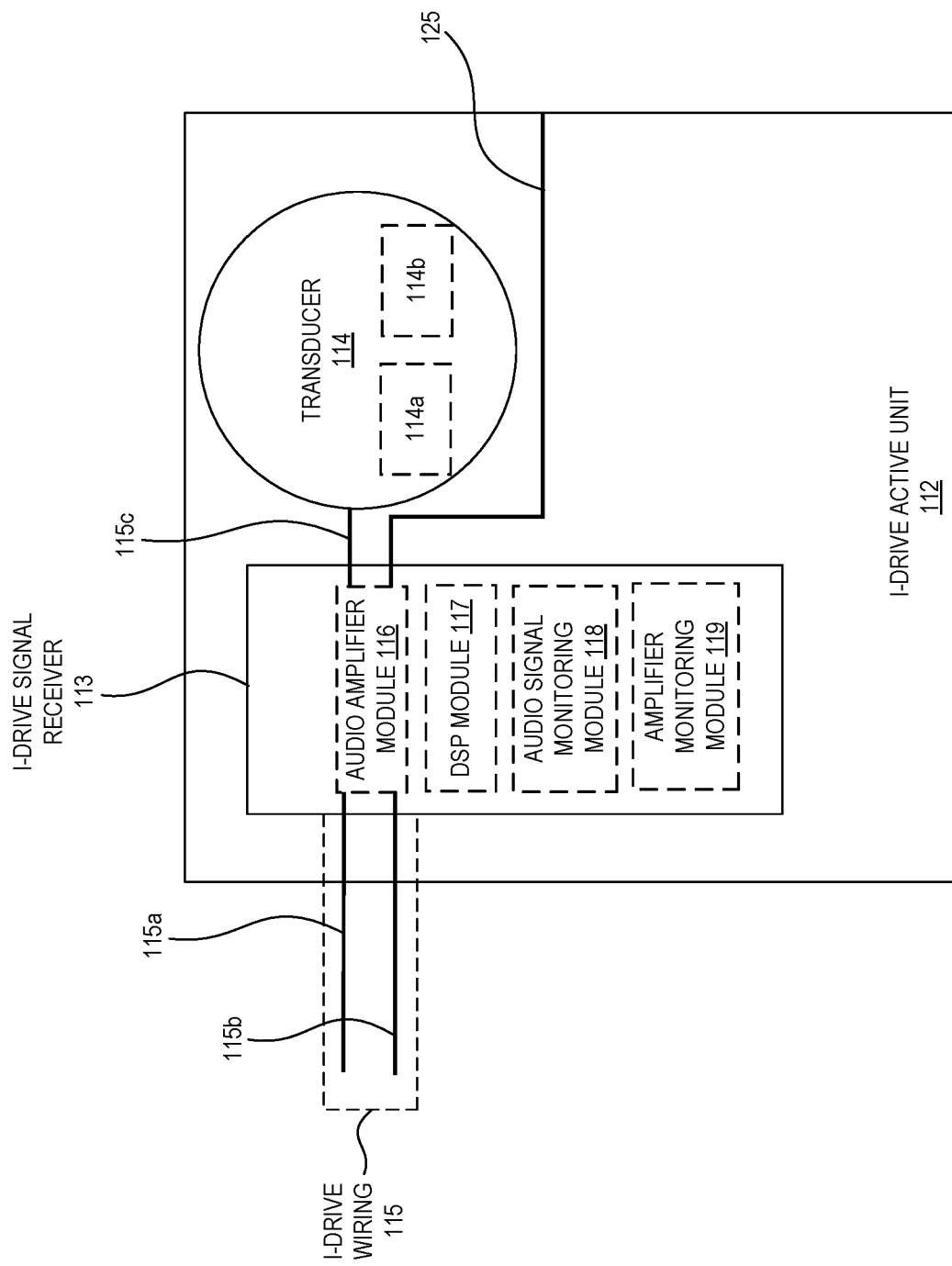
FIG. 1B is an illustration of an infrasound-drive active unit for haptic experiences, according to some embodiments.

FIG. 1B illustrates an i-drive active unit 112 according to some embodiments. Referring to FIG. 1B, i-drive active unit 112 represents a tactile device configured to provide a haptic experience to a user occupying an object in which the unit is mounted, and to output an amplified data signal to a neighboring seat structure. Specifically, i-drive active unit 112 is configured to receive a power signal by a power channel 115a and a data signal by a data channel 115b, both through an i-drive wiring 115, which can be a first unitary input connector. In accordance with the embodiment of FIG. 1A, the unitary first input connector, i.e., i-drive wiring 115, can be power over Ethernet cabling, such as PoE++.

Infrasound Drive Active Unit

FIG. 1B illustrates an i-drive active unit 112 according to some embodiments. I-drive active unit 112 represents an active tactile audio device for haptic experiences. In some embodiments, an i-drive active unit can include an i-drive signal receiver 113 and a transducer 114. Power signal and data signal of transmitted through power channel 115a and data channel 115b of i-drive wiring 115 are processed by an i-drive signal receiver 113. This wiring arrangement is distinct from a system that otherwise would require every unit to be driven by a remote amplifier from an external source such as an equipment control room. Likewise, the i-drive active unit 112 is distinct from a haptic device, speaker or the like that requires an AC power source separate from an audio signal. Instead, the i-drive signal receiver 113 provides an amplifier function enabling transducer 114 from the first unitary input connector, i.e., i-drive wiring 115, to generate perceptible tactile feedback.

I-drive signal receiver 113 is configured to output amplified signal 115c to transducer 114 and amplified signal (e.g., amplified signal 125) to a separate i-drive unit (e.g., one of i-drive passive units 122, 132 or 142). I-drive signal receiver 113 can include a multi-channel audio amplifier module 116, a multi-channel digital signal processing (DSP) module 117, an audio signal monitoring module 118, and an amplifier monitoring module 119. Each of amplified signals 125, 135 and 145 can be provided in second to fourth unitary input connectors, respectively.

Multi-channel audio amplifier module 116 provides two or more channels of amplified signals. In some embodiments, the two or more channels can be provided within different communication mediums, in other embodiments the channels can be shared between one or more communication mediums. Audio amplifier module 116 receives a power signal via power channel 115a and data signal via data channel 115b (or alternatively a signal output from DSP module 117 described in detail below) and increases the amplitude of the received signal. Thereby, audio amplifier module 116 produces a proportionally greater amplitude signal to be output. The amplified signal can be output as amplified signals 115c and 125 (in addition to amplified signal 135 or 145, not shown in FIG. 1B). In some embodiments, audio amplifier module 116 can be configured to apply a pre-determined gain to the amplified signal. In some embodiments, audio amplifier module 116 can be configured to apply a specified gain based on a control signal received from an external source or from a user situated in contact or proximity to the i-drive active unit.

Multi-channel DSP module 117 provides two or more channels of processed signals. Multi-channel DSP module 117 can condition an input signal to improve or enhance the quality of the amplified signals 115c and 125. For example, the signal conditioning stage can be configured to extract one or more frequencies from the data signal of data channel 115b for amplification by audio amplifier module 116. Alternatively, the signal conditioning stage can occur after amplification by audio amplifier module 116.

For example, DSP module 117 may output a first channel to provide a full range audio signal based on the digital signal input, a second channel to provide a subharmonic signal that corresponds to a subharmonic frequency, i.e., that represents an integral submultiple of a frequency of the digital signal input, a third channel to provide a filtered signal, such as a signal passed by a low pass filter (LPF) (or bandpass filter) encompassing frequencies lower than a pre-determined cutoff frequency, one or more channels to provide any other digitally processed signal, or any combination of the above channels. DSP module 117 can be optionally configured to combine signals of one or more channels.

In a non-limiting example, DSP module 117 can perform one or more functions to pass the full range audio signal (i.e., data signal of data channel 115b) in a first channel, generate a subharmonic signal in a second channel, enhance the signal quality of a subharmonic signal by a low pass filter in a third channel, and mix the signals produced on each respective channel. DSP module 117 can thereby provide a robust, low frequency signal to the audio amplifier module 116.

The sequence of amplification and processing functions is not limited in this regard. Alternatively, DSP module 117 can similarly provide a robust low frequency signal based on a signal generated by the audio amplifier module 116 to be output as amplified signals 115c and 125.

Thereby, processing is performed with respect to amplified signals 115c and 125 to enhance the low bass tones of an amplified signal and to provide cleaner sound by reducing noise and the like. By providing an enhanced amplified signal, an improved haptic experience can be delivered to the user.

Audio signal monitoring module 118 is provided to monitor the quality of an output signal of i-drive signal receiver 113. Audio signal monitoring module 118 can determine the status of an input signal and one or more output signals. In a non-limiting example, audio signal monitoring module 118 can be configured to compare an output signal, such as amplified signals 115c or 125, to an input signal to determine the amount of distortion or noise of the output signal. Audio signal monitoring module 118 can be configured to indicate a defect or fault, such as a high distortion ratio, for example, by an LED light, email notification, or any other means of notification Amplifier monitoring module 119 is provided to monitor and report the status of i-drive signal receiver 113 or one or more modules thereof. For example, amplifier monitoring module 119 can include one or more sensors, gates or the like, configured to identify a fault in i-drive signal receiver 113. Amplifier monitoring module 119 can be configured to indicate report a fault, such as an excessively high operating temperature, for example, by an LED light, email notification, or any other means of notification As described above, i-drive signal receiver 113 is configured to output amplified signal 115c to transducer 114. Transducer 114 provides a function to generate a haptic force, i.e., as a seat shaker or the like to provide a tactile sensation to a user situated in direct contact, indirect contact or proximity with the i-drive active unit. In one embodiment, transducer 114 can include a stationary coil and a mass having a magnetic polarity. By applying an electric signal to the coil, such as a signal based on an amplified signal 115c, the transducer propels the mass in motion.

For example, transducer 114 can be an eccentric rotating mass vibration motor, in which an off-center mass is moved around the coil. Operation of the motor can produce an asymmetric centripetal force by the motion of the off-center mass. The asymmetric centripetal force can thereby generate a perceivable vibration to be transmitted to the user.

In some embodiments, transducer 114 can be a speaker, an inertial motor, a direct drive motor, a vibrotactile feedback device, or any other motor or tactile feedback device. In some embodiments, transducer 114 can be an inertial motor that combines an asymmetric centripetal force described above with a force or vibration induced by conservation of momentum. That is, when the off-center mass accelerates in one direction, the motor itself can accelerate in a substantially different direction at a proportional rate. In some embodiments, transducer 114 can be implemented using an electromagnetic mechanism. In other embodiments, transducer 114 can be implemented using a piezoelectric mechanism.

Transducer 114 can include a transducer temperature controller 114a. For example, transducer temperature controller 114a can be a heat sink, for example a heat sink shell casing. Transducer temperature controller 114a can alternatively or additionally include a thermostat and cooling fan. Transducer temperature controller 114a has a function of reducing or limiting a temperature of transducer 114 to a pre-determined operating range.

Transducer 114 can include a transducer enable controller 114b. For example, transducer enable controller 114b can be switch connected to an object in which the i-drive unit 112 is mounted or connected to an external source. Transducer enable controller 114b has a function of enabling the transducer and, hence, the i-drive active unit 112, based on the presence or absence of a user in contact or proximity to the i-drive active unit or based on the preferences of the user.

Infrasound Drive Passive Unit

Figure 1C:
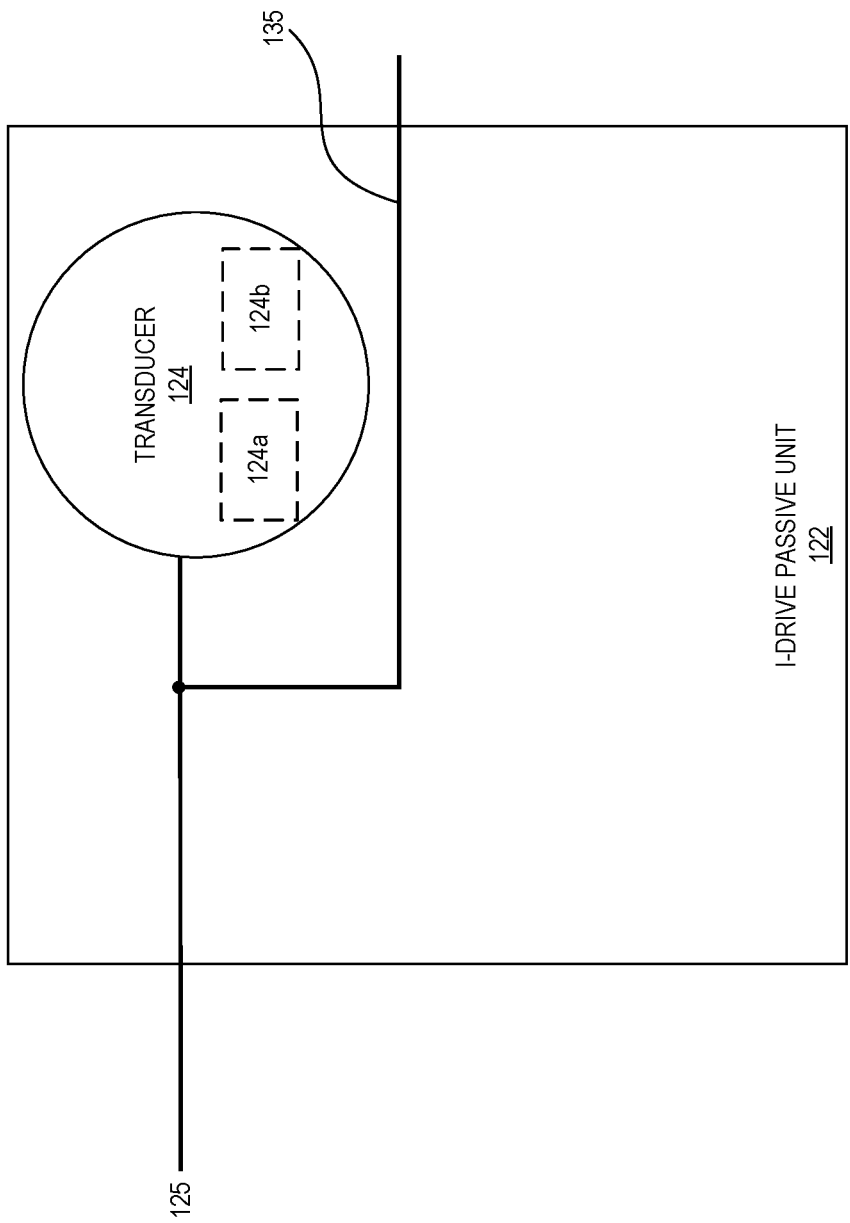
FIG. 1C is an illustration of an infrasound-drive passive unit for haptic experiences, according to some embodiments.

FIG. 1C illustrates an i-drive passive unit 122 according to some embodiments. I-drive passive unit 122 represents a passive tactile audio device for haptic experiences. I-drive passive unit 122 is similar to i-drive active unit 112 but includes transducer 124 while omitting a separate amplifier such as i-drive signal receiver 113.

I-drive passive unit 122 is configured to receive a data signal, i.e., amplified signal 125 from the i-drive active unit 112, processed by i-drive signal receiver 113 therein. Transducer 124 provides a function to generate a haptic force to provide a tactile sensation to a user situated in direct contact, indirect contact or proximity with the i-drive passive unit 122. As with transducer 114, transducer 124 can include a transducer temperature controller 124a and a transducer enable controller 124b. Transducer 124 can be configured similarly or identically to transducer 114 described in detail above, therefore elements of transducer 124 are described above with respect to transducer 114. Transducer 124 can include a transducer enable controller 114b.

EXAMPLES

I-Drive System Incorporated in Seat Support Structure or Seat Structure

Figure 2:
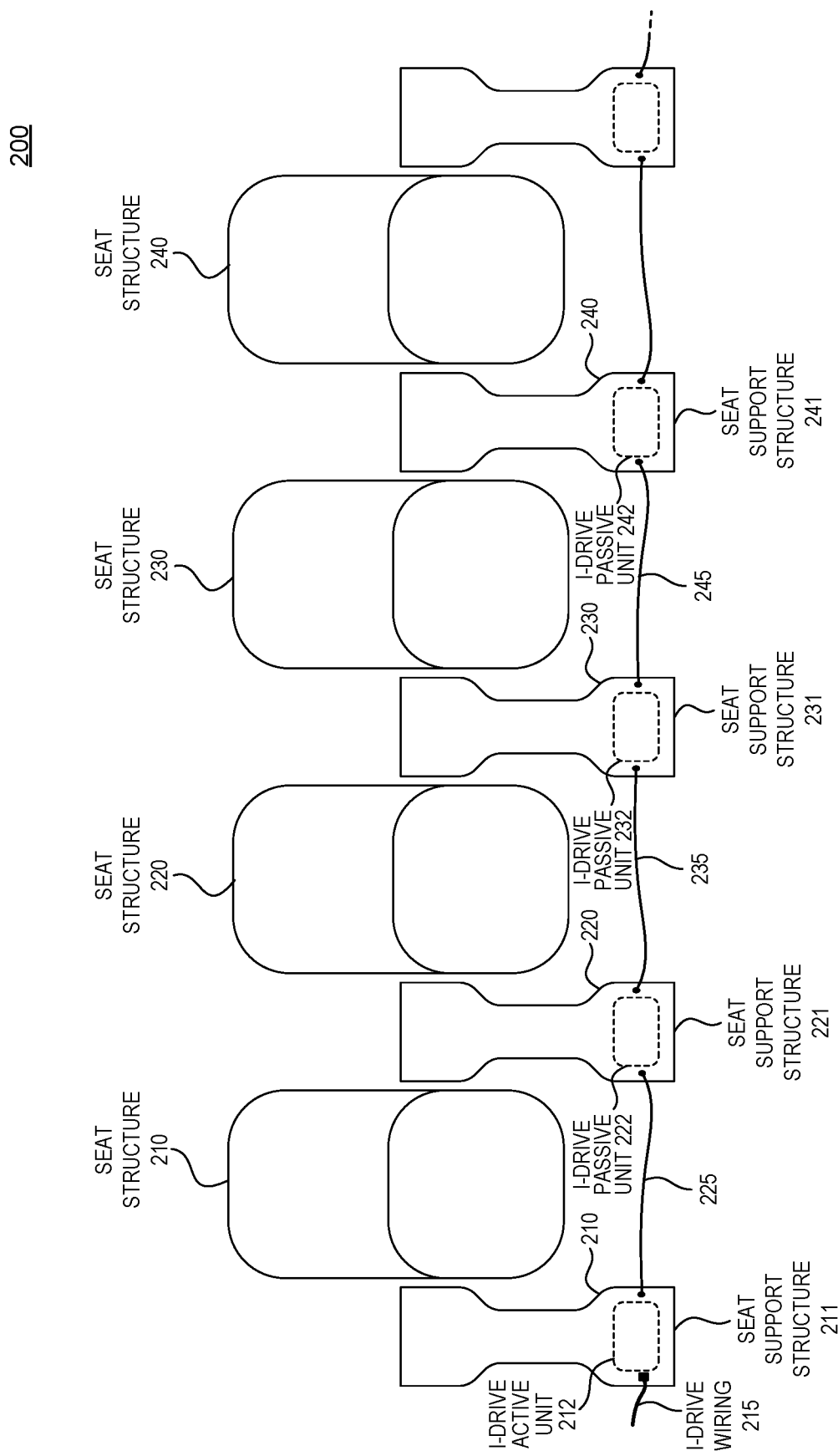
FIG. 2 is an illustration of an infrasound-drive system implemented in an arrangement of seat structures, according to some embodiments.

Embodiments of the i-drive system 100 can be attached to surfaces such as floors, seating pans, seating back rests, and the like to deliver haptic experiences to users, such as audience members. FIG. 2 illustrates an i-drive system 200, which represents an embodiment of i-drive system 100 incorporated in a row of seat structures.

Referring to FIG. 2, i-drive system 200 includes first seat structure 210, second seat structure 220, third seat structure 230, and fourth seat structure 240. First seat structure 210 includes i-drive active unit 212 mounted in a housing of a seat support structure 211. First seat structure 210 includes i-drive active unit 212 mounted in a housing of a seat support structure 211. I-drive wiring 215 is provided to i-drive active unit 212, which can be an embodiment of an i-drive active unit of FIG. 1B. Second seat structure 210 includes i-drive passive unit 222 mounted in a housing of a seat support structure 221. Third seat structure 220 includes i-drive passive unit 232 mounted in a housing of a seat support structure 231. Fourth seat structure 210 includes i-drive passive unit 242 mounted in a housing of a seat support structure 221. Each of i-drive passive units 222 to 242 can be an embodiment of an i-drive passive unit of FIG. 1C.

As described in the embodiments of FIGS. 1A to 1C, i-drive active unit 212 receives a power signal over a power channel 115a and a data signal over a data channel 115b, from i-drive wiring 215. I-drive active unit 212 is configured to provide a tactile vibration to a user situated in first seat structure 210. I-drive active unit 212 can output an amplified signal 225 to i-drive passive unit 222 mounted in a second seat support structure 221 of second seat structure 220. I-drive passive unit 222 generates a tactile vibration from the amplified signal 225, which is transmitted to a user situated in second seat structure 220. I-drive passive unit 222 can output an amplified signal 235 to i-drive passive unit 232 mounted in a third seat support structure 231 of third seat structure 230. I-drive passive unit 232 generates a tactile vibration from the amplified signal 235, which is transmitted to a user situated in third seat structure 230. I-drive passive unit 232 can output an amplified signal 245 to i-drive passive unit 242 mounted in a fourth seat support structure 241 of fourth seat structure 240. I-drive passive unit 242 generates a tactile vibration from the amplified signal 245, which is transmitted to a user situated in fourth seat structure 240.

In operation, i-drive active unit 212 and i-drive passive units 222, 232 and 242 can transfer a tactile vibration to each user situated in first to fourth seat structures 210, 220, 230 and 240, respectively. For example, i-drive active unit 212 and i-drive passive units 222, 232 and 242 can transfer low frequency tactile feedback to each respective user.

Figure 3:
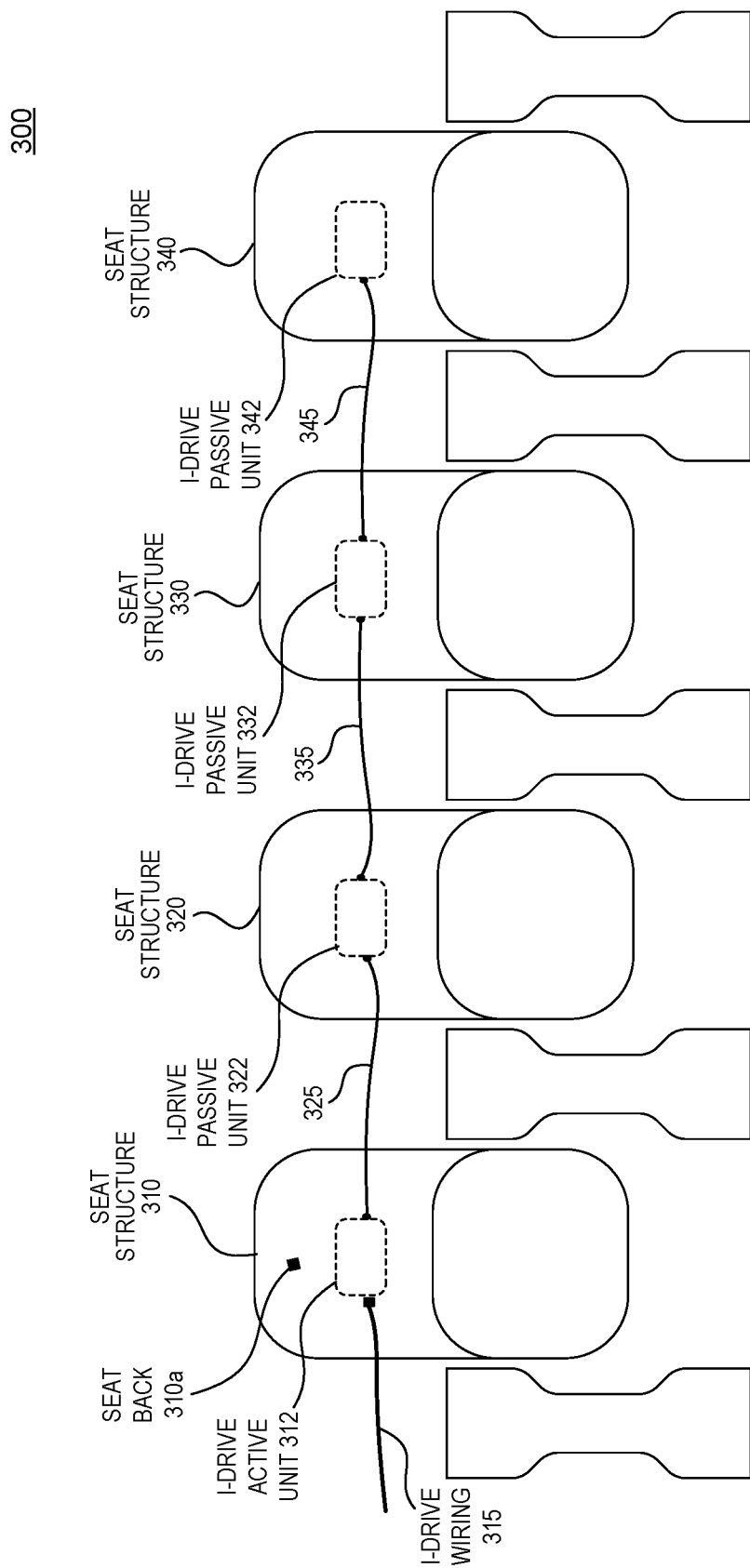
FIG. 3 is an illustration of an infrasound-drive system implemented in an arrangement of seat structures, according to some embodiments.

In an alternative embodiment illustrated in FIG. 3, i-drive system 300, which can also be an embodiment of i-drive system 100, includes i-drive active units and i-drive passive units that can be incorporated in seat backs in a row of seat structures.

Referring to FIG. 3, i-drive system 300 includes first seat structure 310, second seat structure 320, third seat structure 330, and fourth seat structure 340. First seat structure 310 includes i-drive active unit 312 mounted in a first seat back 310a. Second seat structure 320 includes first i-drive passive unit 322 mounted in a second seat back 320a. Third seat structure 330 includes second i-drive passive unit 332 mounted in a third seat back 330a. Fourth seat structure 340 includes fourth i-drive passive unit 342 mounted in a fourth seat back 340a.

I-drive wiring 315 is provided to i-drive active unit 312, which can be an embodiment of an i-drive active unit of FIG. 1B. I-drive active unit 322 generates a tactile vibration based on the power signal and data signal provided in i-drive wiring 315. Each of i-drive passive units 322 to 342 can be an embodiment of an i-drive passive unit of FIG. 1C. I-drive active unit 312 can output an amplified signal 325 to first i-drive passive unit 322. I-drive passive unit 322 generates a tactile vibration from the amplified signal 325, which is transmitted to a user situated in second seat structure 320. First i-drive passive unit 322 can output an amplified signal 335 to second i-drive passive unit 332. Second i-drive passive unit 332 generates a tactile vibration from the amplified signal 335, which is transmitted to a user situated in third seat structure 330. Second i-drive passive unit 332 can output an amplified signal 345 to third i-drive passive unit 342. Third I-drive passive unit 342 generates a tactile vibration from the amplified signal 345, which is transmitted to a user situated in fourth seat structure 340.

For illustration purposes only, i-drive systems 200 and 300 are shown with four interconnected seat structures, i.e., first to fourth seat structures 220 to 240 or 320 to 340. However, embodiments of i-drive systems 200 and 300 are not limited by this arrangement and may include any number of interconnected seat structures.

I-drive systems 200 and 300 are distinct from a system that includes a speaker under a seat structure or within a housing connected or proximate to a user. By integrating a transducer and a signal receiver in a housing, including within a housing of a seat structure, a user (e.g., an audience member or guest) is enabled by i-drive systems 200 and 300 not just to hear the sound, but to feel the sensation of the sound by the tactile vibration.

I-drive systems 200 and 300 benefit from locating both amplification and signal processing circuitry within a housing connected or in proximity to a user. In providing a unitary cable, i-drive wiring 215 or 315, to deliver power and an audio signal, i-drive systems 200 and 300 reduce facility impact costs and complications. Embodiments of o-drive systems 200 and 300 avoid the need to otherwise provide and conceal high gauge wire from the external source, e.g., a server provided in an external equipment room, to each seat structure.

Applications of i-drive systems 200 and 300 can be implemented in numerous systems and venues, including but not limited to a theme park venue including a theme park ride, theatrical, musical, sporting, performance or any other entertainment venue, military simulators, flight simulators, motion simulators, gaming systems, Americans with Disabilities Act (ADA) enhanced experiences (e.g., haptic feedback systems to provide sound for the deaf), motion seats, home audio systems, and the like.

The embodiments of i-drive systems 200 and 300 are distinct from a system that would require a speaker or motor mounted in a seat to each be connected to an external signal source by bulky cabling that is difficult to conceal (e.g., by heavy gauge wires, such as 14 gauge wires). In theatrical venues and performance venues, such an arrangement would require bulky speaker wire being run over long distances such as down a row of seats to connect to a seat, every seat requiring an independent connection.

Figure 4:
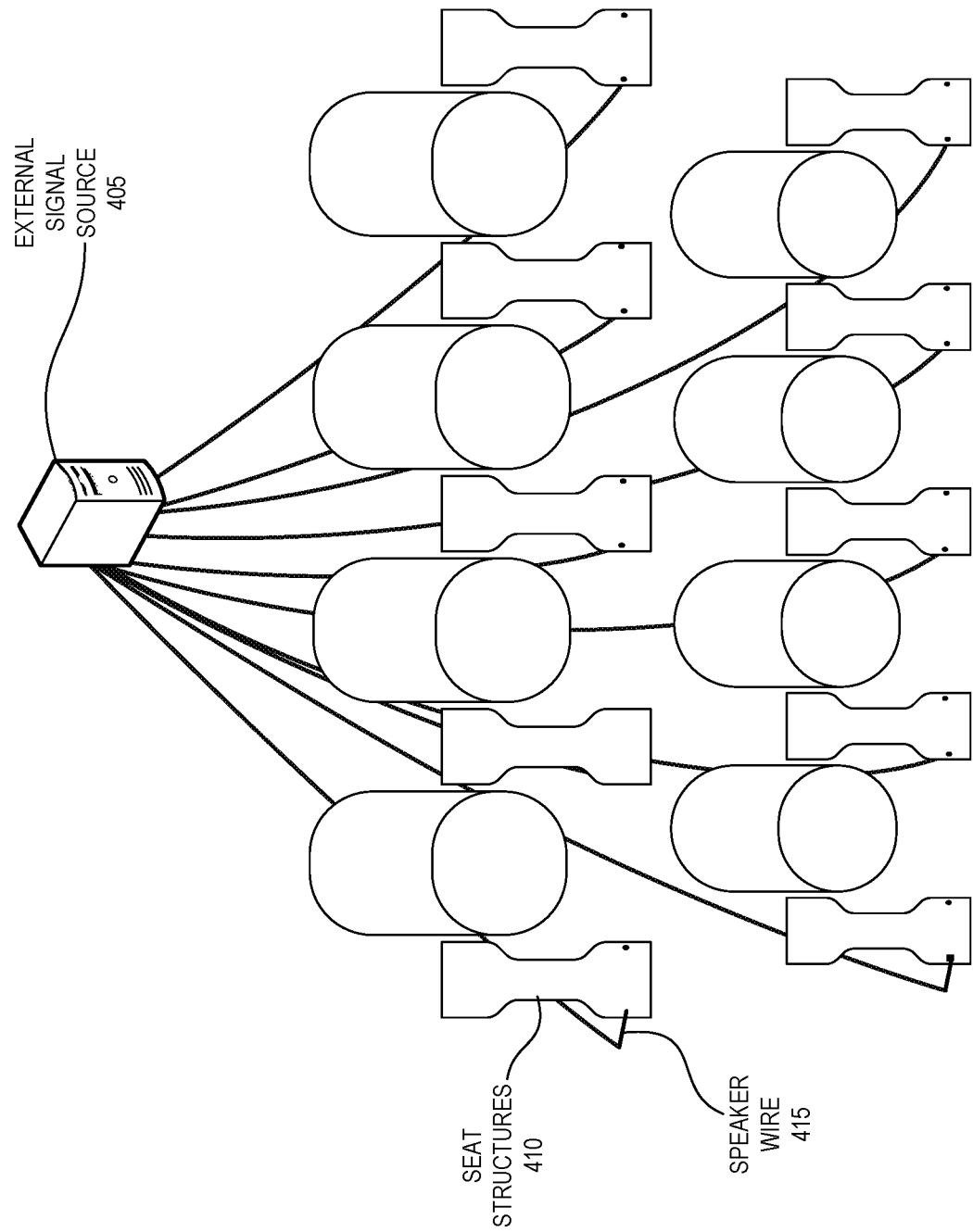
FIG. 4 is an illustration of an arrangement of seat structures, each seat structure connected independently to an external source.

FIG. 4 illustrates an arrangement of an external signal source 405 connected to several seat structures 410 by heavy gauge speaker wire 415, such as copper cabling. Each of seat structures 410 may include a speaker or motor mounted therein (not shown) and connected to an external signal source 405 speaker wire 415. As shown in FIG. 4, I theatrical venues and performance venues, such an arrangement would result in speaker wire being run over long distances, for example, in a star topology or alternatively in a daisy-chain down a row of seats, each seat structure requiring a bulky connection.

Figure 5:
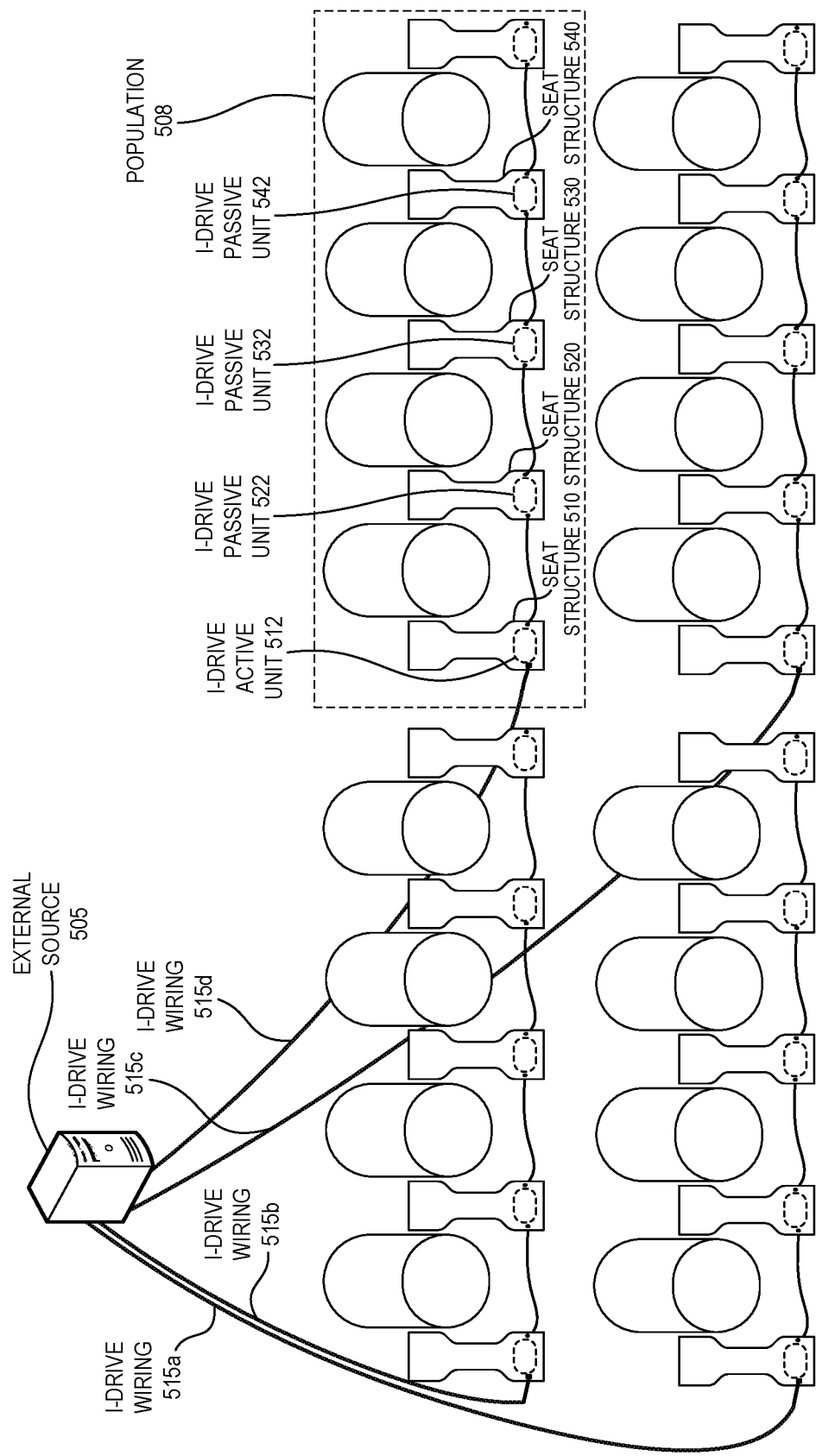
FIG. 5 is an illustration of an arrangement of seat structures in an infrasound-drive system implemented, according to some embodiments.

By alternative, embodiments described herein reduce the cost and complexity of purchasing and installing excessive speaker to support a haptic experience for each seat. FIG. 5 illustrates an alternative i-drive system 500 arrangement that can be an embodiment of i-drive system 200 or i-drive system 300. Each population 508 in i-drive system 500 includes seat structures 510 to 540. Seat structures 510 to 540 include i-drive active unit 512 and i-drive passive units 522 to 542, respectively.

As described above, an advantage of an arrangement of i-drive system 500 is that by implementing a transducer (e.g., transducer 114) and amplifier (e.g., i-drive signal receiver 113) in a single unit, each i-drive active or passive unit can be powered by an i-drive wiring 115 connected to the i-drive active unit 512. As described above with respect to FIGS. 1A to 1C, the i-drive wiring 115 combines a power channel and a signal channel at low-cost in a self-contained unit. The power signal and data signal can be provided in a shared i-drive wiring 515a to 515d, thereby avoiding the need for heavy gauge wiring to provide a separate power source for provide each amplified signal.

As described in the above embodiments, a transducer of the i-drive active unit 512 and each of first to third i-drive passive units 522, 532 and 542 can be a driver motor that can be directly or indirectly mounted or adapted to the housing. The transducer of the i-drive active unit 512 and each of first to third i-drive passive units 522 to 542 can be an inertial motor mounted directly to the seat back of seat structure 510, a direct drive motor mounted to an arrangement of seat mounting brackets of a seat structure 510, or can be any other arrangement providing a transducer in contact with seat structure 510. An amplifier of i-drive active unit 512 can be an embodiment of i-drive signal receiver 113 that can include a low-frequency (LF) audio amplifier, a multi-channel LF amplifier, such as a 4-channel LF audio amplifier and can include additional circuitry configured to perform one or more digital signal processing functions.

Each population 508 of i-drive system 500 can be connected to external source 505 by a multichannel i-drive wiring, 515a to 515d. I-drive wiring 515a to 515d can be a form of power over Ethernet cabling, such as wiring based on standards of POE, PoE+ or PoE++ (e.g., 802.3, 802.3af, 802.3at, 802.3bt) or any later POE standard.

By comparison with an arrangement illustrated in FIG. 4, i-drive system 500 includes a simpler arrangement of i-drive wirings 515a to 515d connected to each population 508. This arrangement is distinct from the heavy gauge wiring that must be routed, protected and concealed to each seat structure 410 to 440 of the FIG. 4 arrangement. By contrast, i-drive passive units 522 to 542 of neighboring seat structures 520 to 540 only require speaker wire jumpers having a reduced distance (i.e., the distance from the neighboring seat).

I-Drive System Including Haptic Force Magnitude Control

Figure 6:
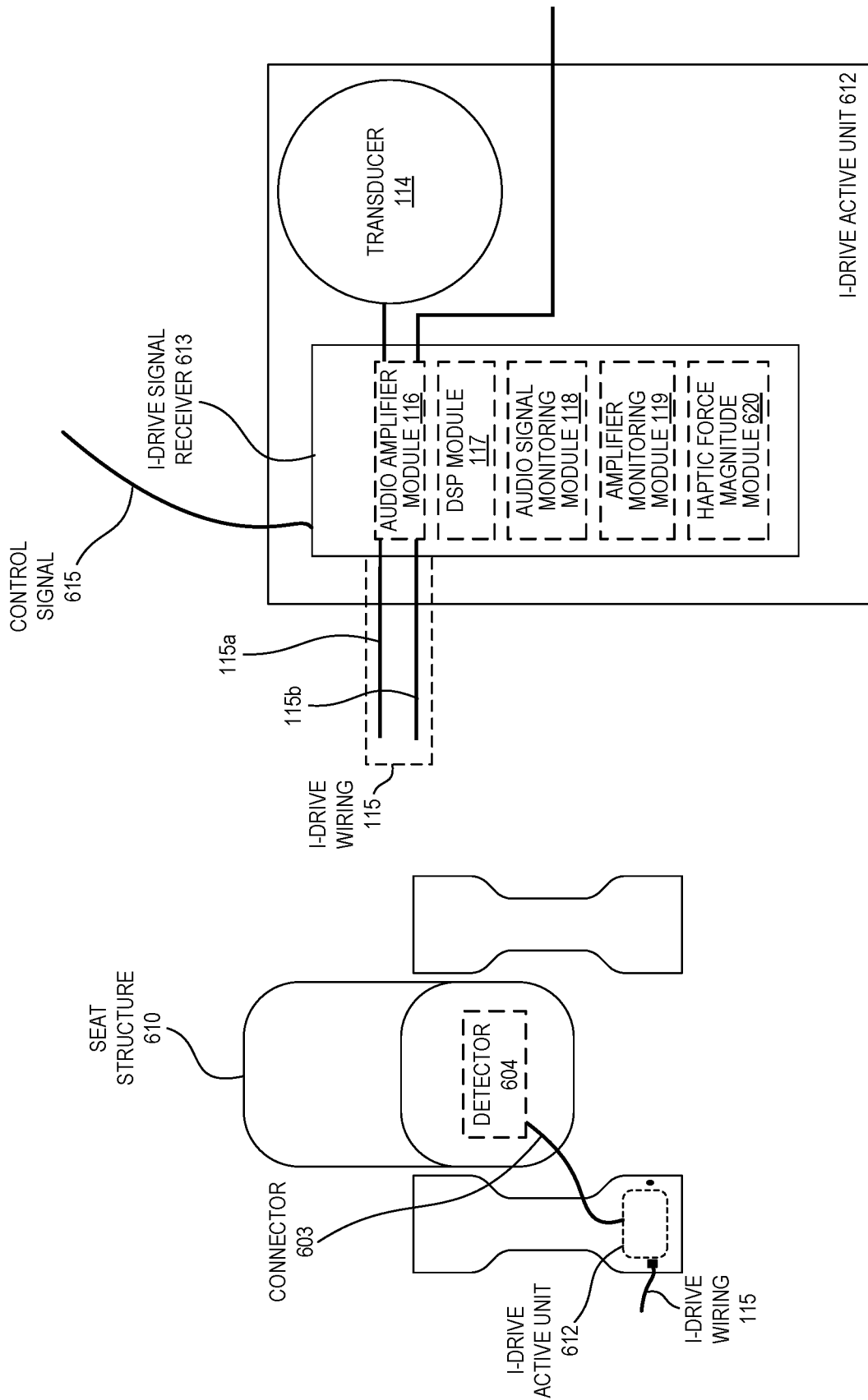
FIGS. 6A and 6B are illustrations of embodiments of an infrasound-drive system implemented that include controllers for limiting haptic force magnitude, according to some embodiments.

FIGS. 6A and 6B illustrate an i-drive active unit having a mechanism for controlling or enabling haptic force magnitude, according to some embodiments. Elements shown in other embodiments, such as i-drive passive units, are omitted herein for better understanding. One of ordinary skill in the art would understand such elements as described above.

Elements in FIGS. 6A and 6B with the same annotations as elements in FIGS. 1A to 5 are described above. Referring to FIGS. 6A and 6B, i-drive active unit 612 can be an embodiment of i-drive active units 112, 212, 312 and 512. As shown in FIG. 6A, seat structure 610 includes a detector 604 configured to detect the presence or absence of a user within the seat structure and controlling or limit haptic force magnitude accordingly. Detector 604 can be include a sensor, switch, or other circuit, such as a mechanical, optical, piezoelectric, or any other circuit that can be triggered by a user situated in the seat structure 610. I-drive active unit 612 is connected to detector 604 by connector 603 and configured to enable i-drive signal receiver 113, transducer 114, or both within i-drive active unit if a user is detected within seat structure 610. Likewise, i-drive active unit 612 can be configured to disable i-drive signal receiver 113, transducer 114 (e.g., by transducer enable controller 114b), or both if a user is determined to not be present.

As shown in FIG. 6B, additionally or alternatively, i-drive active unit 612 can include i-drive signal receiver 613, which can be an embodiment of i-drive signal receiver 113. I-drive signal receiver 613 includes a haptic force magnitude module 620 that can limit the magnitude of haptic force, i.e., tactile vibration or feedback, that is transmitted through an attached structure, such as seat structure 610.

In a non-limiting example, haptic force magnitude module 620 can be configured to limit haptic force magnitude based on the determination of detector 604 that a user is not situated in a corresponding seat structure. In another non-limiting example, haptic force magnitude module 620 can be configured to receive a control signal 615 from an external source, including from a control based on an operation performed by the user. For example, a server provided in an equipment room may provide a control signal 615 to change a level of haptic force magnitude generated by i-drive active unit 612. In some embodiments, the haptic force magnitude may be set by the user, for example, by an application on the user's mobile, portable or other computerized device. Thereby, the control signal 615 can provide a user's preferred limit of haptic force magnitude that is actuated by haptic force magnitude module 620.

Process for Providing Infrasound Experience

Figure 7:
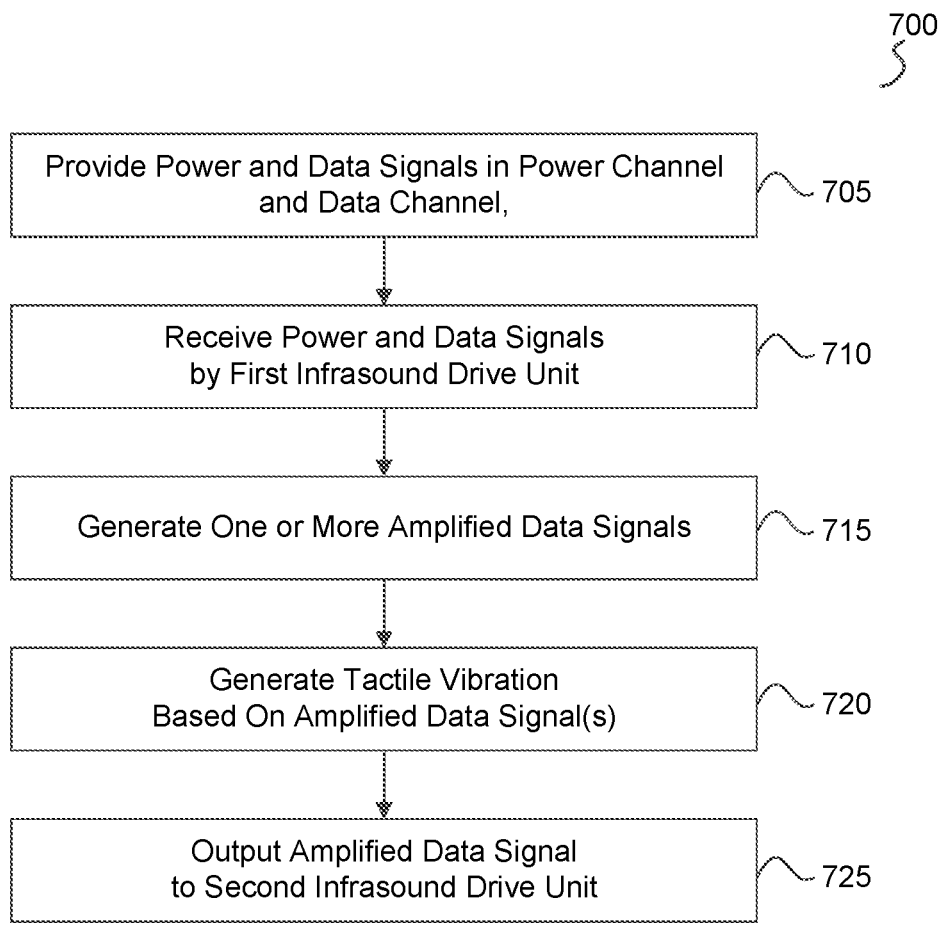
FIG. 7 is a flow diagram of a method for providing tactile vibration by an infrasound drive.

FIG. 7 illustrates an arrangement of an infrasound drive method 700 for generating a tactile vibration. Examples can incorporate any of the embodiments disclosed herein to include methods and systems for providing infrasound haptic feedback to a user based on an externally sourced audio signal. For example, Referring to FIG. 7, at operation 705, a power signal and a data signal (e.g., an audio signal) are provided in a power channel and a data channel, respectively, by an external source. Operation 705 can include providing the power signal and data signal in a unitary input connector. An external source may be, for example, a server housed in an equipment room of a performance venue, an external facility, or the like.

At operation 710, a first infrasound drive unit, which can be an embodiment of i-drive active unit 112, 212, 312, 512 or 612, receives the power signal and the data signal from a first input connector that includes the power channel and the data channel. For example, the first input connector can be a unitary input connector that includes both channels. Operation 710 can include a process of receiving the power channel and the data channel from a power over Ethernet (PoE) cable, such as a cable compliant with standards of POE, PoE+ or PoE++ (e.g., 802.3, 802.3af, 802.3at, 802.3bt) or any later POE standard.

At operation 715, one or more amplified data signals is generated by the first infrasound drive unit based on the power signal from the power channel and the data signal from the data channel. For example, a multi-channel LF amplifier, which can be an embodiment of i-drive signal receiver 113, 213, 314, 513 or 613, can generate an amplified signal based on the data signal and powered by the power signal. The amplified data signal can be generated by a multi-channel LF amplifier, such as a 4-channel LF audio amplifier.

Operation 715 may include processing, by the first infrasound drive unit, the first data signal by one of a low pass filter and a subharmonic filter. For example, operation 715 can include processing the data signal to generate a processed data signal. Then, the enhanced data signal can be amplified to providing the one or more amplified data signals based on the processed data signal. Alternatively, the processing may be performed before or after the amplification, and the processing can be performed in a separate operation that occurs before or after operation 715.

Operation 715 can further include a process of limiting a magnitude of the haptic force by the first infrasound drive unit. For example, a haptic force magnitude based can be limited based on the determination of a user detector, such as detector 604, that a user is not situated in a corresponding seat structure. Alternatively or additionally, a control signal can be received that includes an instruction to limit a magnitude of a haptic force generated by the infrasound drive. An instruction to limit a magnitude of haptic force generated by the infrasound drive may be based on an instruction provided by an application on the user's mobile, portable or other computerized device. That is, the instruction can specify the user's preferred limit of haptic force magnitude.

At operation 720, a tactile vibration is generated by the first infrasound drive unit, based on the one or more amplified data signals. For example, a transducer, which may be an embodiment of transducer 114, can generate a haptic force to a user in contact with housing. Operation 720 can include a process to provide a tactile sensation to a user situated in direct contact, indirect contact or proximity with the first infrasound drive unit.

Operation 720 can include a process of generating the tactile vibration by applying an electric signal to the coil, such as the amplified data signal, to propels the mass in motion with respect to a coil. For example, operation 720 can include a process of generating a vibration by an eccentric rotating mass vibration motor, or in any other manner, to generate a perceivable vibration to be transmitted to the user. In some embodiments, a process of limiting a magnitude of haptic force by the first infrasound drive unit, described above in operation 715 can instead be performed in operation 720 or in any other operation.

At operation 725, a second data signal is output by the first infrasound drive unit to a second infrasound drive unit, whereby a vibration is generated based on the one or more amplified data signals by the second infrasound drive unit. Like a transducer of a first infrasound drive unit, a transducer of a second infrasound drive unit can be an embodiment of transducer 114, and can generate a haptic force to a user in contact, either direct or indirect, or proximity with the second infrasound drive unit.

A system includes a control circuit for transmitting a data signal and a power signal, a first infrasound drive unit and a second infrasound drive unit. The first infrasound drive unit includes an input terminal for receiving a first unitary input connector, an amplifier, and a first tactile transducer. The first input connector includes at least a power channel and a first data channel. The amplifier is configured to receive the power signal from the power channel and the data signal from the first data channel and output an amplified data signal over two or more channels; and a first tactile transducer. The second infrasound drive unit includes a second input terminal for receiving a second unitary input connector and a second tactile transducer. The second input connector includes a second data channel. The amplifier outputs the amplified data signal to the first tactile transducer and the second input terminal. The first tactile transducer and the second tactile transducer each are configured to receive the amplified data signal and generate a tactile vibration based on the data signal.

The first infrasound drive unit additionally includes a signal processing circuit configured to process the amplified data signal by performing one or more of a low pass filter or a subharmonic filter process. The system additionally includes a first unitary housing includes the first infrasound drive unit; and a second unitary housing includes the second infrasound drive unit.

In some embodiments, the first infrasound drive unit is disposed within a first housing, and the second infrasound drive unit is disposed within a second housing, where the first housing is enabled to transmit a haptic force to a first user in contact with the first housing and the second housing is enabled to transmit a haptic force to a second user in contact with the second housing.

In some embodiments, the first infrasound drive unit is disposed within a first seat structure, and the second infrasound drive unit is disposed within a second seat structure, where the first seat structure is enabled to transmit a first haptic force to a first user situated on the first seat structure and the second seat structure is enabled to transmit a second haptic force to second user situated on the second seat structure.

The first infrasound drive unit is configured to control a first haptic force magnitude, where the first user is enabled to change the first haptic force magnitude. The second infrasound drive unit is configured to control a second haptic force magnitude, where the second user is enabled to change the second haptic force magnitude. The first haptic force magnitude and the second haptic force magnitude limit magnitude of the first haptic force and the second haptic force, respectively.

In some embodiments, the first unitary input connector is configured to receive at least the power channel and the first data channel by a power over Ethernet (PoE) cable. In some embodiments, the unitary input connector is configured to receive the power signal having at least 100 watts (W) by the PoE cable, where the amplifier is configured to output the one or more amplified data signals to the first tactile transducer and the second input terminal based on the power signal.

An infrasound drive includes an input terminal for receiving a first unitary input connector, an amplifier, and a first tactile transducer. The first unitary input connector includes at least a power channel and a data channel. The amplifier is configured to receive power from the power channel and a data signal from the data channel and output an amplified data signal over two or more channels. The amplifier outputs the one or more amplified data signals to the first tactile transducer. The first tactile transducer is configured to receive the amplified data signal and generate a tactile vibration based on the data signal.

The infrasound drive additionally includes a signal processing circuit configured to process the amplified data signal by performing one or more of a low pass filter or a subharmonic filter process.

In some embodiments, the infrasound drive is configured to be disposed within a unitary housing where the unitary housing is enabled to transmit a haptic force based on the tactile vibration to a user in contact with the unitary housing. In some embodiments, the infrasound drive is disposed within a seat structure where the seat structure is enabled to transmit a haptic force based on the tactile vibration to a user situated on the seat structure.

In some embodiments, the infrasound drive is configured to control a haptic force magnitude, where the user is enabled to change the haptic force magnitude, and the haptic force magnitude limits the magnitude of the haptic force. In some embodiments, the first unitary input connector is configured to receive at least the power channel and the data channel from a power over Ethernet (PoE) cable.

In some embodiments, the first unitary input connector is configured to receive the power signal having at least 100 watts (W) from the PoE cable and where the amplifier is configured to output the one or more amplified data signals to the first tactile transducer and the second input terminal based on the power signal.

A method for generating a tactile vibration includes receiving, by a first infrasound drive unit, a first input includes at least a power channel and a data channel from a unitary input connector, providing, by the first infrasound drive unit, one or more amplified data signals based on a power signal from the power channel and a data signal from the data channel, generating, by the first infrasound drive unit, a tactile vibration based on the one or more amplified data signals; and outputting, by the first infrasound drive unit, a second data signal to an input channel received by a second infrasound drive unit. The tactile vibration is generated by a tactile transducer of the first infrasound drive unit. The further includes processing, by the first infrasound drive unit, the first data signal by one of a low pass filter and a subharmonic filter, where the providing the one or more amplified data signals based on the data signal includes providing the one or more amplified data signals based on the processed data signal.

In some embodiments, the method includes transmitting, by the first infrasound drive unit, a haptic force to a user in contact with the housing. In some embodiments, the method includes limiting, by the first infrasound drive unit, a magnitude of the haptic force. In some embodiments, the receiving the first input includes receiving the power channel and the data channel from a power over Ethernet (PoE) cable.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A passive infrasound drive (i-drive) unit, comprising:
a tactile transducer configured to:
receive an amplified data signal that is generated by an active i-drive unit in response to a power signal and a data signal that are received by the active i-drive unit over a wiring, the wiring including a power channel having the power signal and a data channel having the data signal; and
generate a tactile vibration based upon the amplified data signal; and
a housing configured to transmit the tactile vibration to a user.

2. The passive i-drive unit of claim 1, wherein the amplified data signal is from among a plurality of amplified data signals, and
wherein the passive i-drive unit further comprises:
an output device configured to output a second amplified data signal among the plurality of amplified data signals to a second passive i-drive unit.

3. The passive i-drive unit of claim 2, wherein the passive i-drive unit and the second passive i-drive unit are connected by a second wiring having a lower gauge than the wiring.

4. The passive i-drive unit of claim 1, wherein the housing is configured to transmit the tactile vibration to the user via a seat structure.

5. The passive i-drive unit of claim 1, further comprising a transducer enable controller configured to enable the tactile transducer based on a presence or an absence of the user in contact with a seat structure.

6. The passive i-drive unit of claim 1, wherein the housing is mounted within a seat support structure of a seat structure.

7. The passive i-drive unit of claim 1, further comprising a stationary coil and a mass configured to receive an electric signal from the tactile transducer.

8. The passive i-drive unit of claim 1, wherein the tactile transducer is configured to receive the amplified data signal from the active i-drive unit over a second wiring having a lower gauge than the wiring.

9. The passive i-drive unit of claim 1, further comprising a haptic force magnitude module configured to control a haptic force magnitude provided by the tactile vibration onto the user in response to a user input.

10. The passive i-drive unit of claim 9, wherein the housing is configured to transmit the tactile vibration to the user via a seat structure, and
wherein the haptic force magnitude module is further configured to limit the haptic force magnitude based on a determination that the user is not situated in the seat structure.

11. The passive i-drive unit of claim 9, wherein the haptic force magnitude module is further configured to limit the haptic force magnitude based on a preferred limit of haptic force magnitude received from the user.

12. The passive i-drive unit of claim 1, further comprising a transducer temperature controller configured to limit a temperature of the tactile transducer to a pre-determined operating range.

13. The passive i-drive unit of claim 1, wherein the tactile transducer comprises: a speaker, an inertial motor, a direct drive motor, or a vibrotactile feedback device.

14. The passive i-drive unit of claim 1, wherein the housing is disposed in a gaming device.

15. The passive i-drive unit of claim 1, wherein the housing is disposed in a floor.

16. The passive i-drive unit of claim 1, wherein the housing is disposed in a flight simulator.

17. The passive i-drive unit of claim 1, wherein the housing is disposed in a theme park ride.

18. The passive i-drive unit of claim 1, wherein the housing is incorporated in a seat back in a seat structure from among a row of seat structures.

19. A system, comprising:
a control circuit configured to transmit a data signal and a power signal over a wiring including a data channel and a power channel;
an active i-drive unit configured to:
receive the power signal from the power channel and the data signal from the data channel, and
provide a plurality of amplified data signals over a plurality of channels based upon the data signal; and
a passive i-drive unit configured to generate a tactile vibration for a seat structure, the passive i-drive unit comprising:
a tactile transducer configured to:
receive an amplified data signal among the plurality of amplified data signals from the active i-drive unit; and
generate the tactile vibration based upon the amplified data signal; and
a housing configured to transmit the tactile vibration to a user.

20. A method, comprising:
receiving, by a passive i-drive unit, an amplified data signal that is generated by an active i-drive unit in response to a power signal and a data signal that are received by the active i-drive unit over a wiring, the wiring including a power channel having the power signal and a data channel having the data signal;
generating, by the passive i-drive unit, a tactile vibration based upon the amplified data signal; and
transmitting, by the passive i-drive unit, the tactile vibration to a user.

* * * * *

UNITED STATES PATENT AND TRADEMARK OFFICE
CERTIFICATE OF CORRECTION

| | | |
|---|---|---|
| PATENT NO. | : 11,837,079 B2 | Page 1 of 1 |
| APPLICATION NO. | : 17/686640 | |
| DATED | : December 5, 2023 | |
| INVENTOR(S) | : Hockman | |

It is certified that error appears in the above-identified patent and that said Letters Patent is hereby corrected as shown below:

On the Title Page

Column 2, Item (57), under "ABSTRACT", Line 5, delete "transducer, in" and insert -- transducer. In --, therefor.

Signed and Sealed this
Twenty-third Day of January, 2024

Katherine Kelly Vidal
*Director of the United States Patent and Trademark Office*